W. McCLELLAND, Sr.
Draft Equalizers.
No. 146,011. Patented Dec. 30, 1873.
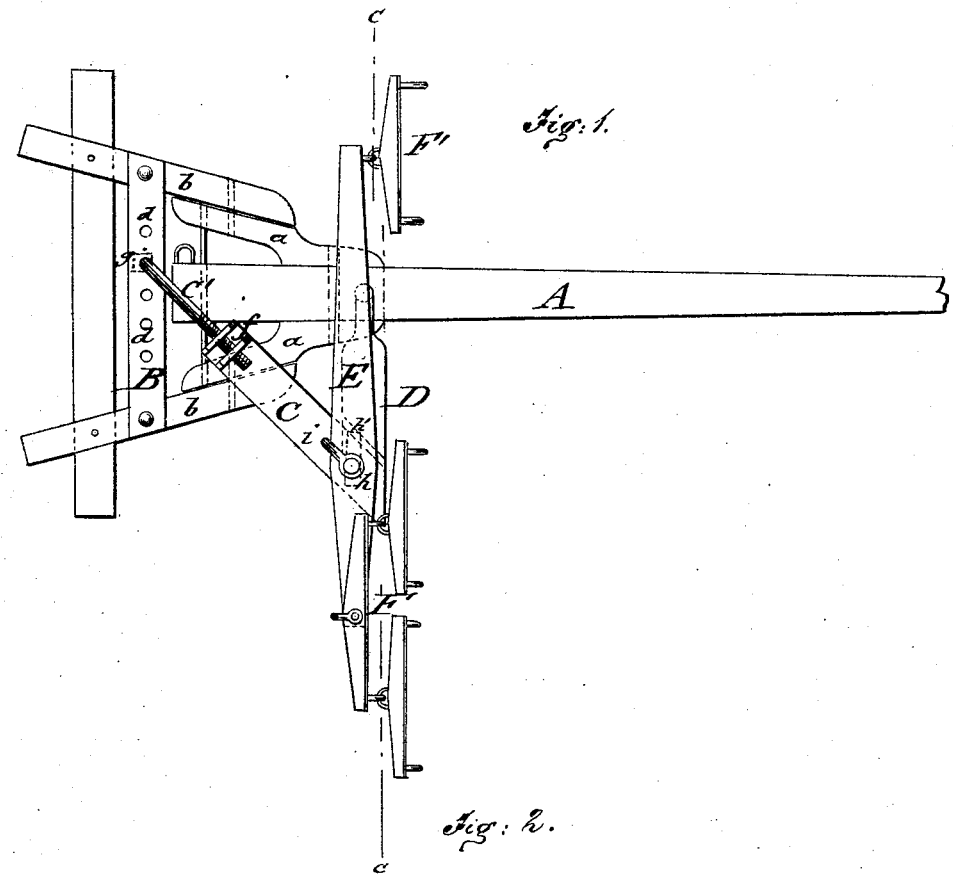
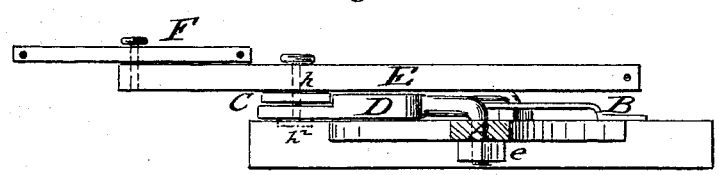
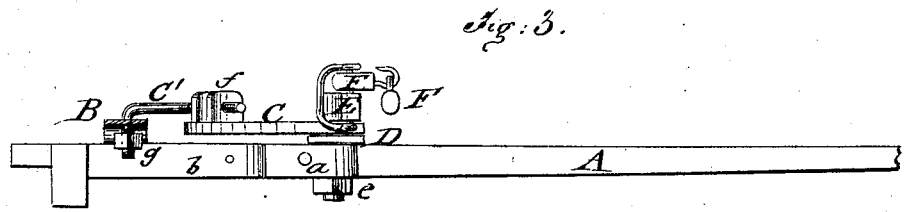
Witnesses:
Chas. Nida
Sedgwick
Inventor:
W. McClelland Sr
Per Munn & Co
Attorneys.

UNITED STATES PATENT OFFICE.

WILLIAM McCLELLAND, SR., OF FOWLER, ILLINOIS.

IMPROVEMENT IN DRAFT-EQUALIZERS.

Specification forming part of Letters Patent No. 146,011, dated December 30, 1873; application filed August 16, 1873.

*To all whom it may concern:*

Be it known that I, WILLIAM MCCLELLAND, Sr., of Fowler, in the county of Adams and State of Illinois, have invented a new and Improved Equalizing Attachment to Reapers, &c., of which the following is a specification:

In the accompanying drawing, Figure 1 represents a top view of my equalizing attachment to reapers, &c.; Fig. 2, a front view, partly in section, on the line $c\ c$, Fig. 1; and Fig. 3, a side view of the same.

Similar letters of reference indicate corresponding parts.

The object of my invention is to produce an equalizing attachment for three horses, to be applied to reapers and other vehicles, by which a greater effect is obtained, and the side draft regulated, as required. The weight of the tongue on the neck of the horses may also be adjusted, making the task easier for them.

My invention consists of a curved bar which is attached to the tongue, and carries the rear extending bar, with regulating-rod, which connects with and is adjustable on a cross-bar of the hounds. Both bars together support the equalizing-bar, and allow the adjustment of the same into any required position.

In the drawing, A represents the tongue of a reaper or other agricultural machine or vehicle, which is pivoted, by its side pieces $a$, to the hounds $b$ of the vehicle. A cross-bar, B, is attached rigidly to the hounds $b$ or the sides $a$ of the tongue, and perforated by a number of holes, $d$, which receive the extension-rod $C'$ of the rear supporting-bar C, for regulating the side draft to any point desired. The main supporting-bar D is applied, by means of its curved arm, to tongue A, and held firmly by nut $e$. The rear supporting-bar C is attached to bar D by an overlapping joint, forming an angle of about forty-five degrees, more or less, with the same. The front or main supporting-bar D is placed nearly on a right angle to the tongue A. Upright lugs or guide-pieces $f$ are rigidly attached to rear supporting-bar C, and provided with threaded holes, in which the extension-rod $C'$ is adjusted before being placed into the holes of cross-bar B. The lugs $f$ preserve the rod $C'$ and bar C in alignment, or cause them to form a rigid brace for the bar D, whereby it is held at the desired angle to the tongue. The bent rear end of the bar C is inserted in one of the holes $d$ of the cross-bar B, and secured therein by a nut, $g$. By removing said nut, the rod can be readily adjusted along the bar B to change the angle of bar D to the tongue. A bolt, $h$, passes through both bars C D and the top equalizing-bar E, which swings thereon. A slot, $h^1$, of the lower bar D, and nut $h^2$, allow the side play of the equalizing-bar. A clevis, $i$, connects the bolt $h$ with bar D, and arrests the equalizing-bar E when under right angles to the tongue, transferring thereby the force of the animals to tongue and cross-bar in the direction of the draft. The double-tree F may be attached to top or front of equalizing-bar, while the single-tree $F'$ for the third horse is placed on the end of the longer part of the same on the other side of the tongue. The attachment of the bars C D to tongue and cross-bar allows also the play of the tongue on the pivots of the hounds, by which the weight of the tongue and the parts weighing thereon on the necks of the horses is lessened.

The apparatus may also be placed under the tongue, being thereby more effective in its action on the tongue, and removing over-weight from the necks of the horses.

Having thus described my invention, I claim as new and desire to secure by Letters Patent—

1. The combination of a pivoted bar, D, bar C, and adjustable screw-rod $C'$, having a fixed point of connection with the hounds, whereby the bar E may be adjusted to equalize the draft, as set forth.

2. The curved and screw-threaded rod $C'$, in combination with the lugs $f$ of rear supporting-bar C, and the cross-bar B, having holes $d$, to provide for adjustment of the angle of bar D, and form a rigid connection between it and the bar B, as specified.

WILLIAM McCLELLAND, SR.

Witnesses:
JOHN POTTER,
J. S. McCLELLAND.